US006126815A

United States Patent [19]

Kelada

[11] Patent Number: 6,126,815

[45] Date of Patent: Oct. 3, 2000

[54] SEQUENTIAL AIR DISSOLVED FLOATATION APPARATUS AND METHODS

[76] Inventor: Maher I. Kelada, 1301 Edgewater, Friendswood, Tex. 77546

[21] Appl. No.: 09/356,967

[22] Filed: Jul. 19, 1999

[51] Int. Cl.[7] .............................................. B01D 21/30

[52] U.S. Cl. ........................... 210/94; 210/103; 210/138; 210/141; 210/142; 210/221.1; 210/221.2; 210/703

[58] Field of Search .................................... 209/168, 170, 209/173; 210/86, 94, 103, 104, 110, 134, 138, 139, 141, 142, 143, 221.1, 221.2, 533, 534, 703, 709, 745

[56] References Cited

U.S. PATENT DOCUMENTS

| | | | |
|---|---|---|---|
| 1,374,447 | 4/1921 | Greenawalt | 209/168 |
| 3,705,650 | 12/1972 | Gotte | 210/221.1 |
| 3,842,004 | 10/1974 | Nagahama | 210/221.1 |
| 3,966,598 | 6/1976 | Ettelt | 210/104 |
| 4,022,696 | 5/1977 | Krofta | 210/520 |
| 4,251,361 | 2/1981 | Grimsley | 210/703 |
| 4,931,175 | 6/1990 | Krofta | 210/221.2 |
| 5,151,177 | 9/1992 | Roshanravan et al. | 210/194 |
| 5,310,485 | 5/1994 | Roshanravan | 210/603 |
| 5,382,358 | 1/1995 | Yeh | 210/194 |
| 5,437,785 | 8/1995 | Roshanravan | 210/95 |
| 5,462,669 | 10/1995 | Yeh | 210/703 |
| 5,538,631 | 7/1996 | Yeh | 210/221.2 |
| 5,660,718 | 8/1997 | Chudacek et al. | 209/164 |
| 5,766,484 | 6/1998 | Petit et al. | 210/703 |
| 5,846,413 | 12/1998 | Krofta | 210/703 |

*Primary Examiner*—Joseph W. Drodge

[57] ABSTRACT

Sequential DAF apparatus and methods providing zero pool and nonmechanical waste material removal are disclosed which include a number of floatation tanks each arranged to operate either independently or sequentially, each tank has a conical shaped bottom with a centrally located port at the lowest vertical position of the tank, each tank is fitted with a number of valves and plumbing which allows an operator to fill each tank with waste water charged with dissolved air through the central port which is then retained during a floatation period to allowed waste material to separate from clarified water in the tank. Clarified water and waste material is removed from the bottom of the tank through the central port. Water clarity sensors are positioned in the tank near the central port. A final rinsing step may be included to assure all floated material is removed from the tank before refilling. The system may include any number of tanks necessary to achieve net flow of the waste water stream entering the system while the tanks are dimensioned and flow rates are adjusted so that a tank fill flow period, retention period, and clarified water and waste material drain period are about equal allowing sequential operation of the system and net flow.

26 Claims, 7 Drawing Sheets

SEQUENTIAL AIR DISSOLVED FLOATATION APPARATUS AND METHODS

TECHNICAL FIELD

The present invention relates to devices and methods for dissolved air floatation removal of light sludge and suspended matter in waste water streams. More specifically, the invention is concerned with an efficient, zero pool velocity, non-mechanical and continuous flow dissolved air floatation waste water treatment system utilizing sequential floatation tanks.

BACKGROUND ART

Removal of suspended solids and matter from liquids such as industrial and municipal waste water is accomplished by several methods. Sedimentation is used for heavier than liquid solids, while filtration is used for solid particles of small size, while dissolved air floatation is used for floatable and lighter than liquid suspended matter.

In dissolved air floatation (DAF), air at high pressure is dissolved in a slip stream of the waste water to be treated and introduced into a floatation tank at a low pressure along with the rest of the waste stream. When the pressure is reduced, micrometer size air bubbles are released and rise through the liquid pool contacting and lifting any floatable suspended matter to the surface of the liquid pool. Turbulence and back mixing are caused by numerous actions including mechanical sludge removal means, high transitional flow, and the rising suspended matter and the descending higher density clarified water. These turbulence actions, either alone or in combination create a pervasive critical factor in DAF and greatly reduces the efficiency of floatation units and frequently render them inoperable. The turbulence and back mixing occurs in a gradually ascending zone while the duration of complete travel time of the turbulent zone depends upon the tank height, and amount and size of floatable matter rising with the liberated microbubbles of air. Poor performance of dissolved floatation units is normally contributed to high liquid transfer velocity and improper equipment design. Best performance is achieved when turbulence and back mixing are minimized.

Complete separation of floatable suspended matter fails to occur when the duration for suspended matter rise to the surface exceeds the residence time of the liquid in the floatation tank. In conventional continuous units, there must be a net water movement in order for the water to flow from an inlet to an outlet. A pool velocity approaching zero is a critical objective to achieve maximum theoretical limits. Prior systems have been developed which have attempted to overcome the problems associated with the turbulence and back mixing while also maintaining a net water movement.

In the conventional DAF system floatable matter is mechanically removed from the surface causing further turbulence and mixing. Numerous inventions have been directed to improving the mechanical means for removing the floatable matter while attempting to minimize turbulence. Some of these patents include: Petit et al. U.S. Pat. No. 5,766,484; Chudacek et al. U.S. Pat. No. 5,660,718; Yeh U.S. Pat. No. 5,538,631; Roshanravan U.S. Pat. Nos. 5,437,785; 5,310,485; 5,151,177; Krofta U.S. Pat. No. 4,022,696. These prior inventions recognized the problem of facilitating removal of the floatable layer while also minimizing turbulence caused by the mechanical action of the removal. The prior methods and apparatus include redesigned floatation tanks, improved mechanical devices that gently remove the floated layer, redesigned tank shapes and interior baffles or other means which increase the surface area in the interior of the floatation tank thereby facilitating quicker floatable material rise time.

Although the prior art has been shown to be extremely useful for the stated purposes, they do not provide a system as the present invention which provides an extremely flexible sequential dissolved air floatation system that includes a continuous system flow utilizing any number of floatation tanks, a single fixed inlet/outlet central port for filling and draining each tank, true zero pool velocity, nonmechanical removal of the floated sludge, and a system that is easily expandable and arranged to meet any inlet flow rate need, while the capital and operating cost are low. The present system further includes means for separating and collecting the floated waste material as well as clarified water utilizing a single tank, or multiple sequential tanks. The invention utilizes any number of floatation tanks, each with a conical bottom with a single centrally located port where waste water charger with dissolved air enters the floatation tank and where separated clarified water is removed from the tank followed by floated waste material. The central port is fitted with a series of valves and plumbing which control the flow of waste water charged with dissolved air into the tank, the flow of clarified water from the tank and the removal of floated waste material from the tank. Since the clarified water is removed from the bottom of the tank(s) prior to removal of the separated floated waste, and since no mechanical means are utilized for removing the floated waste, turbulence caused by any floated waste removal is eliminated resulting in true zero pool velocity. Removal of the clarified water from the bottom of the tank(s) allows for removal of clarified water almost immediately after the tank(s) have been filled with waste water charged with dissolved air. In this regard, the system provides numerous options for operation; the floatation tanks may be filled sequentially and drained sequentially to achieve net waste water flow, any number of tanks may be filled in groups sequentially and drained in groups sequentially or as permitted by the speed of floatation in each tank. Additionally, unlike the prior art, the present invention provides for floatation of suspended waste in a pool that has no transitional movement.

The present invention also may include any number of water clarity optic sensors, which monitor the presence of clarified water in the tank at a location near the central port so that an operator may began draining the clarified water from the tank as soon as possible thereby allowing clarified water to be removed while floated waste material rises in the tank. The clarity sensor(s) and valve actuators are electrically coupled to a controller that controls the filling using a liquid level device and draining flow rate of the tank(s) to achieve maximum efficiency.

GENERAL SUMMARY DISCUSSION OF INVENTION

It is thus an object of the invention to provide DAF apparatus and methods which includes any number of floatation tanks each arranged to operate either independently or sequentially, each tank has a conical shaped bottom with a centrally located port at the lowest vertical position of the tank, waste water charged with dissolved air enters the tank through the central port to fill the tank, floatable waste material is allowed to separate from clarified water in the tank, clarified water is removed from the bottom of the tank through the central port, and finally floated waste material is removed from the tank through the central port, the process is then repeated and while the timing of the steps may be staggered between any number of tanks to achieve net flow of the waste water.

It is a further object of the invention to provide sequential DAF apparatus and methods that includes any number of floatation tanks each including a central port as described above while the port on each tank is fitted with a number of valves and plumbing which allows an operator to fill each tank through the central port with dissolved air charged waste water and to drain clarified water from the tank at an appropriate time through the central port, and further to remove floated sludge from the tank through the central port.

It is a still further object of the invention to provide sequential DAF apparatus and methods that reduces turbulence caused by mechanically removing floated sludge from a floatation tank and further which includes a minimum number of moving parts for operation and results in a true zero velocity pool floatation apparatus and method which greatly increases the efficiency of the DAF system.

It is a still further object of the invention to provide sequential DAF apparatus and methods that include any number of floatation tanks each which includes a central port, valves, and plumbing for filling and draining the tank(s) as described above and wherein the valves are fitted with electrical actuators and each tank includes any number of clarity sensors positioned in the tank to monitor the presence of clarified water at a position near the central port, the clarity sensors and valve actuators are electrically connected to a controller for automatically controlling the filling and draining of the tank(s) and the flow rates to achieve maximum efficiency.

Accordingly, sequential DAF apparatus and methods are disclosed which includes any number of floatation tanks each arranged to operate either independently or sequentially, each tank has a conical shaped bottom with a centrally located port at the lowest vertical position of the tank, each tank is fitted with a number of valves and plumbing which allows an operator, either automatically or manually, to fill each tank with waste water charged with dissolved air through the central port, floatable waste material is then allowed to separate from clarified water in the tank. A number of water clarity sensors are positioned in the tank near the central port which detect clarity of water near the central port. Clarified water is removed from the bottom of the tank through the central port, and finally floated waste material is removed from the tank through the central port, the process is then repeated. A final rinsing step may be included to assure all floated material is removed from the tank before refilling the tank. The interior of the tank may also include baffles or deflectors which may assist with decreasing floatable material rise time, and decrease any vortex which may occur when draining the tanks. The interior components of the tanks may include a surface coating which decreases the interfacial tension between the interior surfaces and the waste water and floated material, thereby decreasing turbulence in the system and decreasing the separation time for the floatable material. The system may include any number of tanks necessary to achieve net flow of the waste water stream entering the system. The tanks may further be filled and controlled to be drained either sequentially, with each tank being filled and drained to achieve net flow, or filled in groups and drained in groups thereby increasing waste water volume through put.

BRIEF DESCRIPTION OF DRAWINGS

For a further understanding of the nature and objects of the present invention, reference should be had to the following detailed description, taken in conjunction with the accompanying drawings, in which like elements are given the same or analogous reference numbers and wherein.

EXEMPLARY MODE FOR CARRYING OUT THE INVENTION

Figure 2:
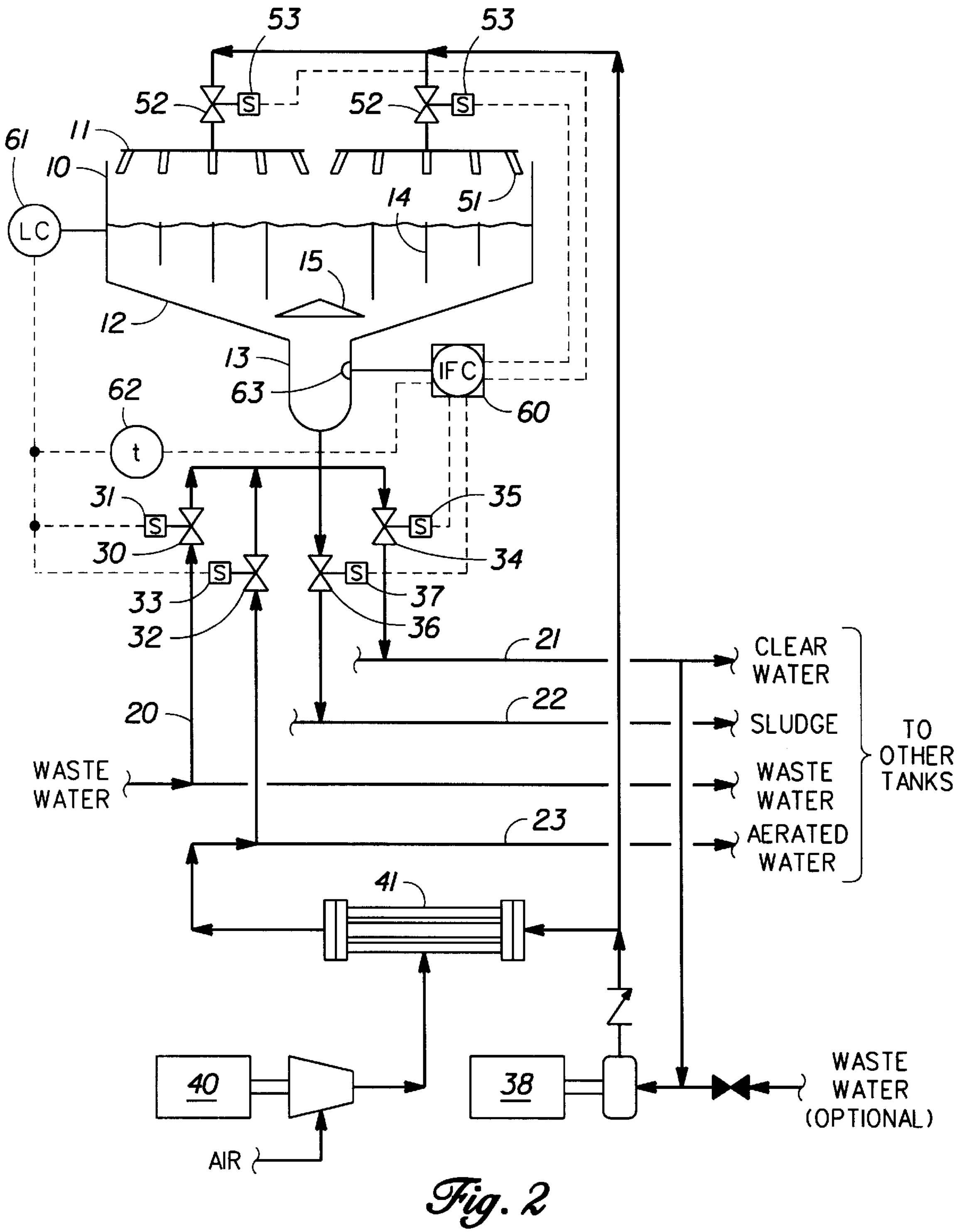
FIG. 2 is a schematic of the components of one floatation tank including the controller, valve solenoids, electrical wiring and plumbing components.
Figure 3:
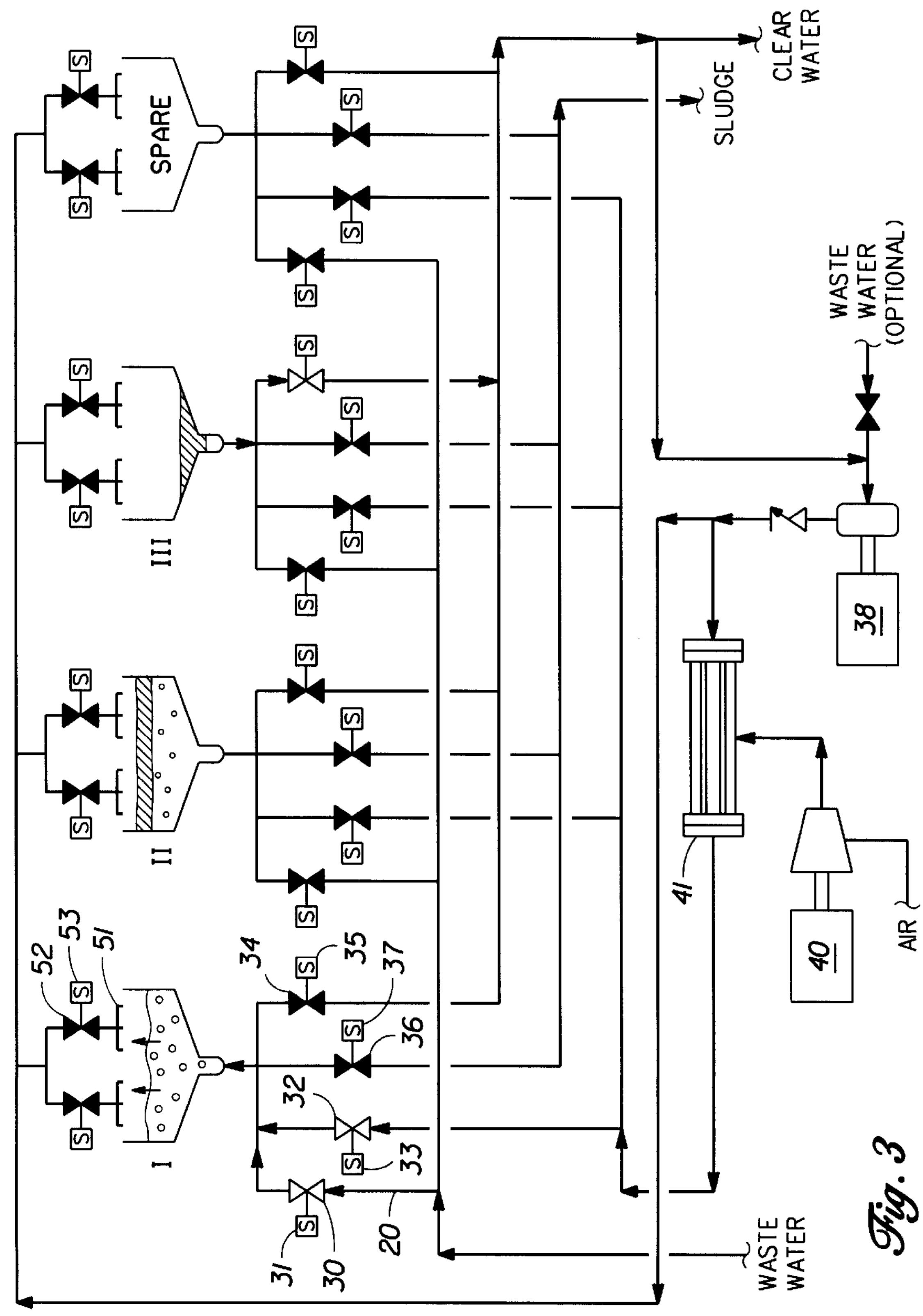
FIG. 3 is a schematic of the components of four floatation tanks plumbed in series and illustrating sequential operation of each tank at a different step in a complete cycle of one batch.

It can be seen from the following description that the sequential air dissolved floatation apparatus and methods may be operated entirely automated or manually. The apparatus and methods may be easily expanded to accommodate any waste water flow rate providing net flow for incoming waste water. The apparatus and methods provide continuous system flow, true zero pool velocity, non-mechanical sludge removal, a single fixed inlet and outlet for each floatation tank, all of which provide high efficiency, low capital and maintenance cost with easy expandability. The apparatus includes any number of floatation tanks, each of which is plumbed to be filled and emptied sequentially through a single central port. FIG. 2 illustrates a single floatation tank 10 with an open top 11 a conical bottom 12 with a central port 13. The floatation tanks may be any shape, even though the figures illustrate square and round floatation tanks. The dimensions of the tank depend on anticipated waste water flow rates. Individual plumbing for each tank is also illustrated in FIG. 2 and includes waste water inlet pipes 20 which fill each tank with waste water through the central port 13. Aerated water inlet pipes 23 which add water with dissolved air to each tank through the central port 13. Clear water outlet pipes 21 which drain clarified water from each tank through the central port 13. Waste material or sludge outlet pipes 23 which drain floated waste material from each tank through the central port 13.

Figure 1A:
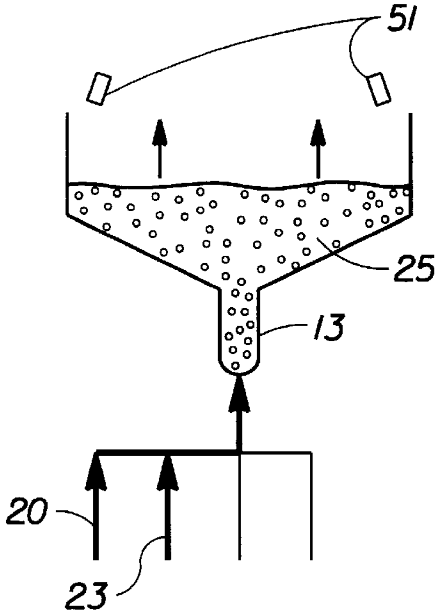
FIG. 1A is a cross sectional view of a floatation tank illustrating the initial filling step of the tank with dissolved air charged waste water through the central port at the bottom of the floatation tank.
Figure 1B:
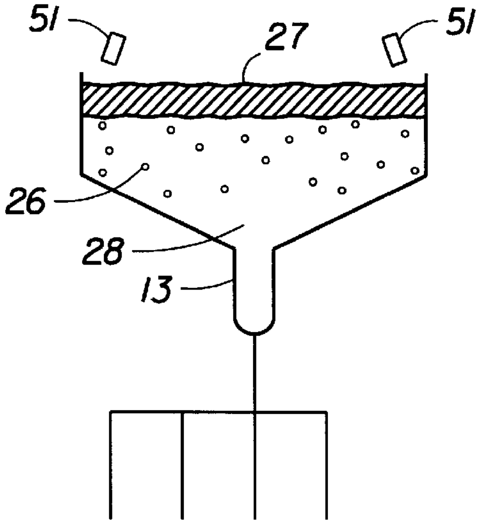
FIG. 1B is a cross sectional view of a floatation tank illustrating the floatation separation step with clarified water moving to the bottom of the tank and floating waste particles with air bubbles moving to the top of the tank.
Figure 1C:
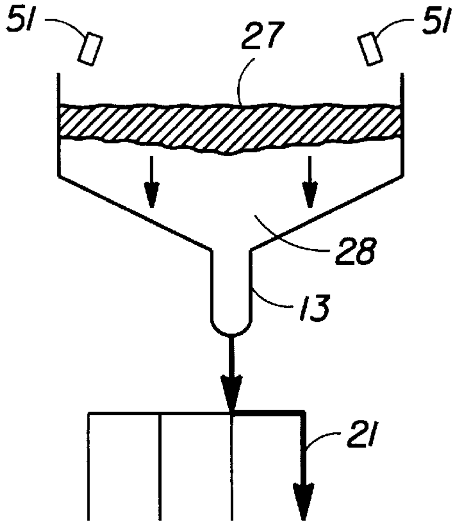
FIG. 1C is a cross sectional view of a floatation tank illustrating the drainage of the clarified water from the central port of the floatation tank.
Figure 1D:
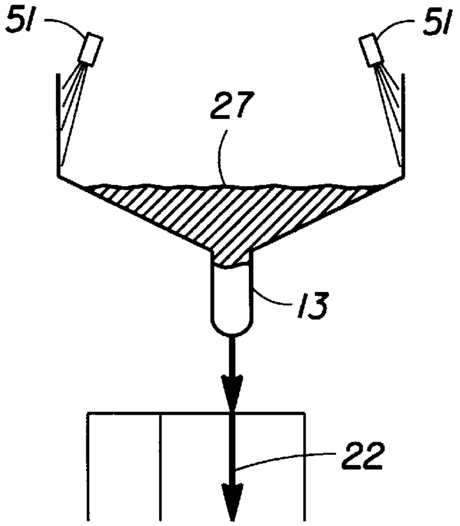
FIG. 1D is a cross sectional view of a floatation tank illustrating the drainage of the sludge from the central port of the floatation tank along with activation of optional rinsing jets.
Figure 6:
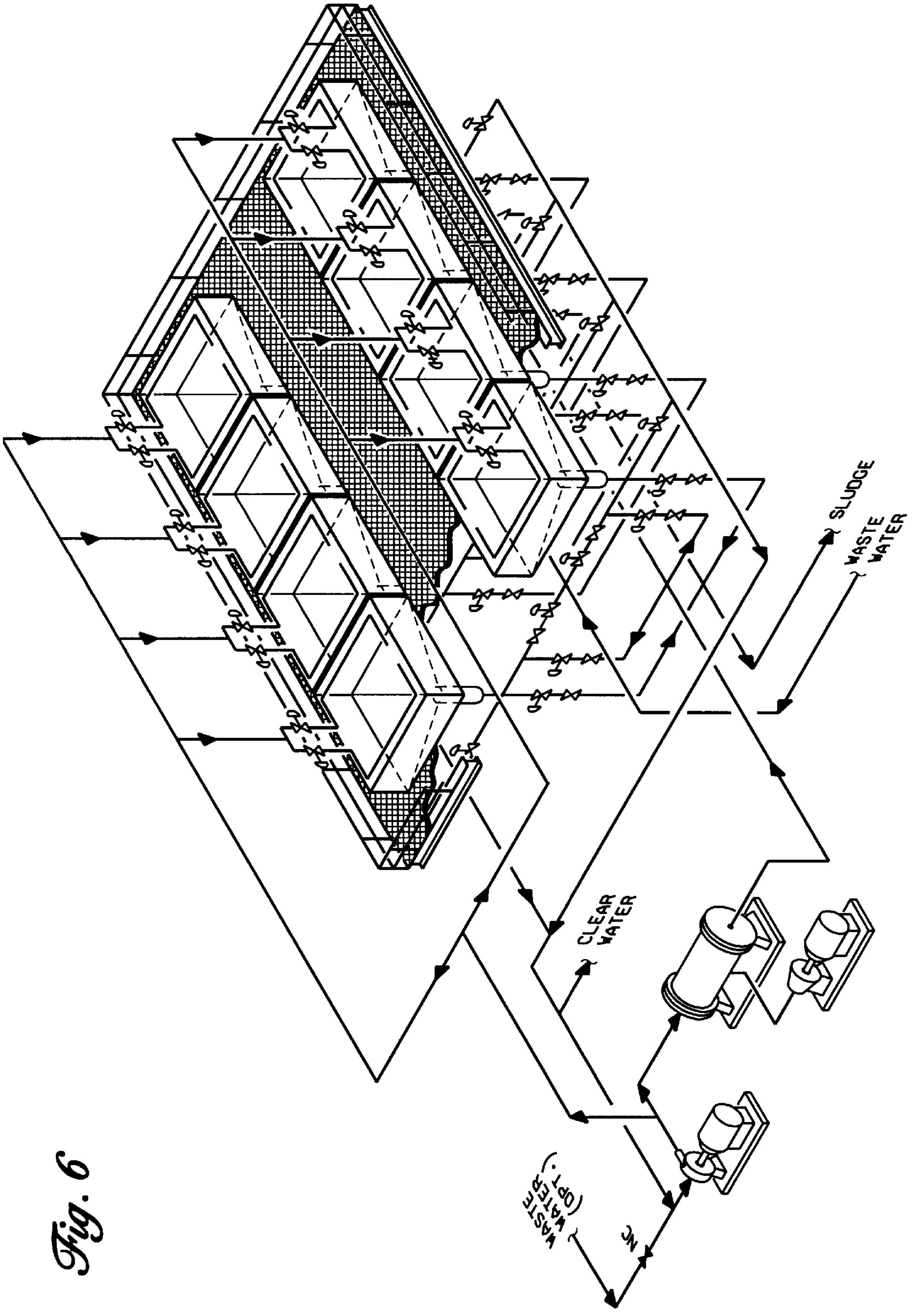
FIG. 6 is an isometric view of two sets of four square floatation tanks installed as one unit illustrating the expandability of the system and components.
Figure 7:
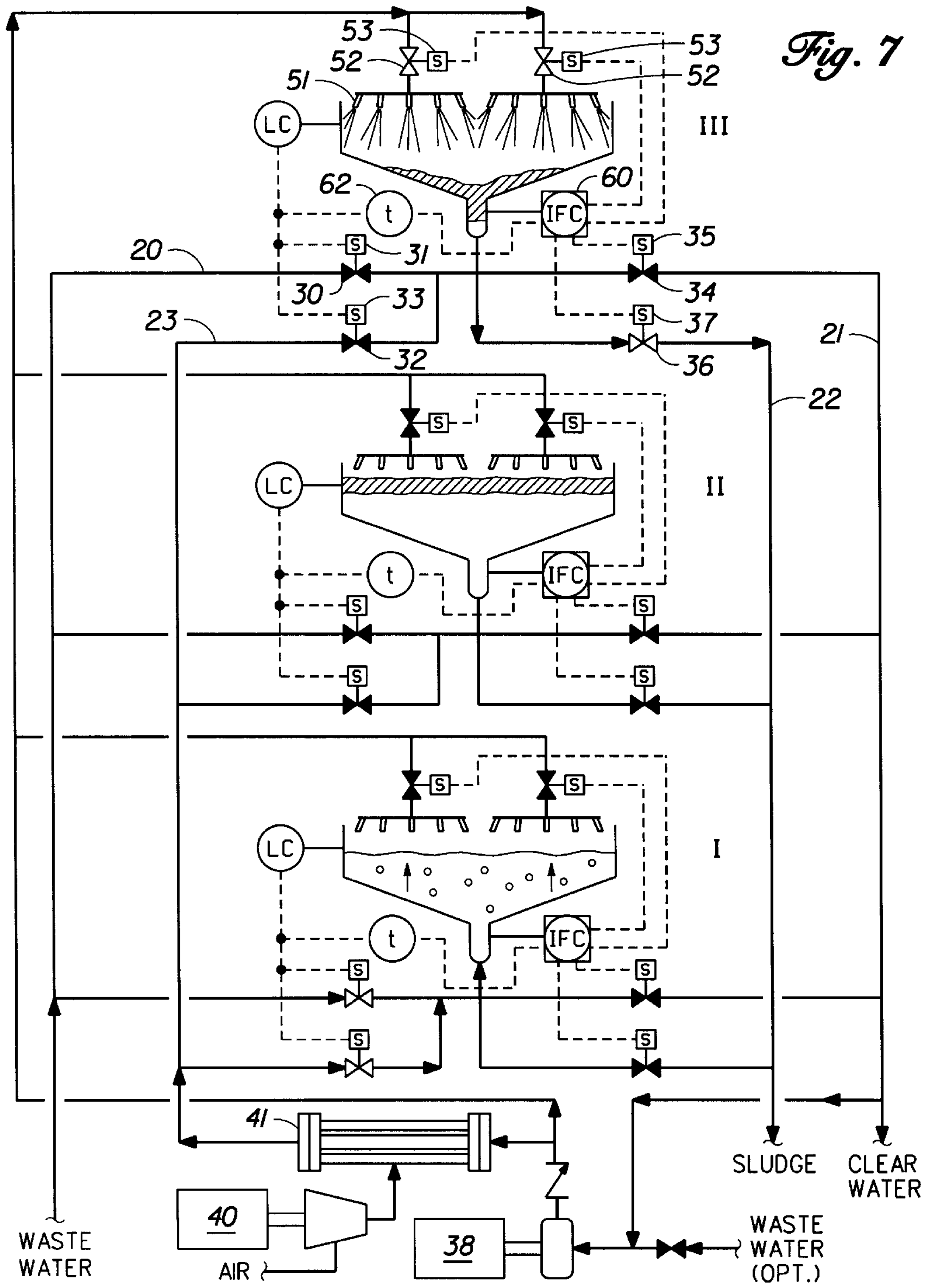
FIG. 7 is a cross sectional schematic of three floatation tanks stacked in vertical orientation with each tank at a different stage of operation illustrating the sequential operation of the system and components and further illustrating space saving capabilities of the system.

The interior dimension of the tanks, the inlet flow rates of the waste water and aerated water, and the outlet flow of the clarified water and waste material are adjusted so that a net flow of waste water can be handled by the apparatus. Higher flow rates will require the use of multiple tanks which are filled, and drained sequentially. FIGS. 3, 5A, 5B, 6 and 7 illustrate the operation and plumbing schematic for multiple tank apparatus. The steps for each tank for one fill and empty cycle are the same no matter how many tanks are utilized. FIGS. 1A–D illustrate the steps for one tank, where FIG. 1A shows the waste water and aerated water 25 filling the tank through the central port 13. FIG. 1B illustrates the retention period in which dissolved air is liberated and forms small bubbles 26 which rise to the surface carrying floatable waste material 27 and forming a floating waste material layer and a bottom clarified water layer 28. FIG. 1C illustrates the clarified water 28 draining step through the same central port 13. FIG. 1D illustrates the waste material 27 draining step with concurrent rinsing of the interior of the tank. In order for multiple tanks to be operated sequentially and providing a net flow of waste water the steps illustrated on FIGS. 1A–D must be timed so that at least one tank is always being filled with waste water. Two tanks may be operated to provide a net flow of waste water if a waste water filling period is about equal to the time necessary to accomplish the combined steps of: retention period allowing floatable material it rise to the surface, draining the clarified water, and draining the floated waste material. The two tank operation may be utilized in a high flow rate capacity system during turn-down operation, as in the case of low inlet flow into a waste water system designed for high capacity. Three tanks may be operated to provide a net flow of waste water if the waste water filling period is about equal to a retention period (the amount of time it takes for floatable waste material to rise to the surface of the waste water in the tank), and which in turn is about equal to the clarified water and waste material drain periods combined. With three tank operation there will be three distinct periods which control filling and draining of the tanks and the following steps; initially a first a tank is filled with waste water, after the first tank is filled a second tank is filled while the first tank is in the retention period, after the second tank is filled a third tank is filled with waste water concurrently while the first tank is drained of clarified water and floated waste material while the second tank is in a retention period, the first tank is then refilled while the second tank is drained of the clarified water and floated waste material while the third tank is in a retention period. The sequential filling, retention and draining of the tanks is repeated continuously. An extra tank may be included in the apparatus and method in order to accommodate for any disturbances with the system. The tanks may also be operated in groups to further increase the flow rate as illustrated in FIG. 6.

An example of tank capacity, flow rates and retention time wherein a tank's operating volume is 7500 gallons, the tank liquid height is 4 feet, and a tank conical section height is 4 feet, and diameter is 16 feet, floatation time was about 0.65–2.0 ft/min, waste water flow rate was 1000 GPM and a recycle air charged flow rate was 500 GPM. With these dimensions and flow rates the steps of filling, retention, and draining where 5 minutes each.

Figure 4:
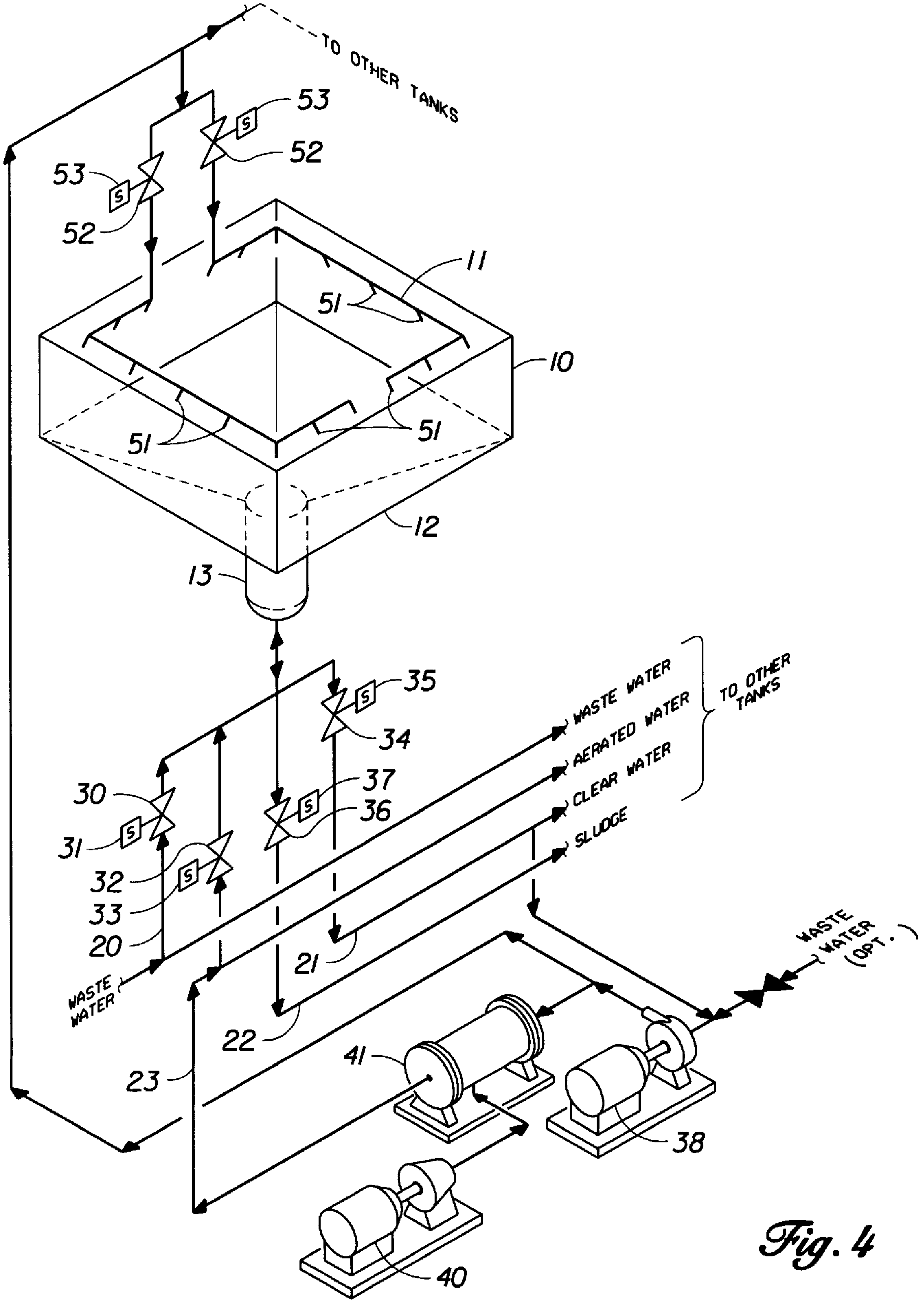
FIG. 4 is an isometric view of one floatation tank and components.
Figure 5A:
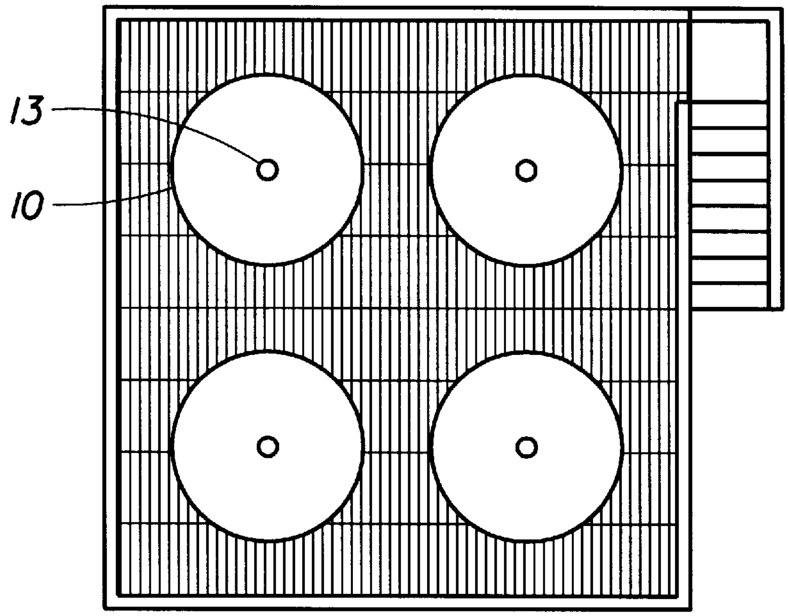
FIG. 5A is a top view of four round floatation tanks mounted within one unit.
Figure 5B:
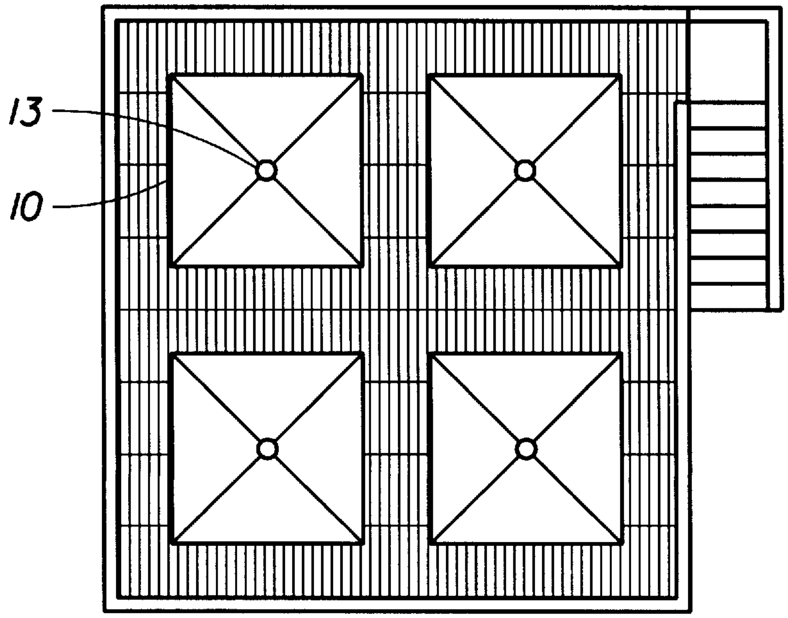
FIG. 5B is a top view of four square floatation tanks mounted within one unit.

As shown in FIG. 4, waste water is supplied to any number of tanks by a main waste water inlet pipe which is branched to any number of tanks, flow to one tank being illustrated. The flow of waste water through the inlet pipe is controlled by a waste water valve 30 at each tank central port which is fitted with an actuator 31 while the flow rate may vary depending on tank volume and retention time. Aerated water is charged in aerator 41 with air supply 40 which charges water with dissolved air by any means known by those skilled in the art, the flow of aerated water at each tank central port is controlled by an aerated water inlet valve 32 which is fitted with an actuator 33 while the flow rate may be about fifty percent of the waste water stream flow rate, however may be varied to operate the system at peak efficiency. The aerated water may be produced from clarified water drained from a tank or optionally produced from waste water. The flow of clarified water from each tank is controlled by a clarified water valve 34 located at the central port of each tank and which valve is fitted with an actuator 35. The flow of waste material from each tank is controlled by a waste material valve 36 located at the central port of each tank and which valve is fitted with an actuator 37. Rinse water supply pipes 50 extend up and over each tank and include multiple water nozzles 51 and valve 52 with electrical actuators 53 directed and positioned to spray rinse water on interior surfaces of the tanks and components inside the tank at the end of the waste material drain period. The rinse water may either be waste water or clarified water while the rinse water flow rate is about 100 GPM at about 100 psi. The rinse water is applied to an interior of each tank utilizing a rinse water flow rate that will accommodate the supply, thereby maintaining a high spray pressure and low flow rate while rinsing each tank. In this regard, a number of rinse water valves are provided for each tank and any number of the rinse water valves are actuated sequentially to achieve effective rinsing and preferable in a merry-go-round pattern.

In the typical air dissolved floatation apparatus, air bubbles are liberated from the dissolved air charged waste water stream when pressure on the waste water is reduced by entering the floatation tank, which is maintained at ambient conditions. The liberated air bubbles adhere to waste particles as they rise to the surface of the tank. The rising particles(with attached air bubbles) and the falling higher density clarified water creates a turbulent zone, above which is increasingly higher concentrations of floated waste material and below which is clarified water. The turbulent zone slowly rises until about all clarified water is below a floated layer of waste material. Turbulence also occurs on the surface of the interior of the tank and interior components of the tank and by the mechanical action of removing the floated waste material layer. Reducing back mixing turbulence is accomplished by including baffles 14 in the interior of the floatation tanks which provide surfaces on which floating material accumulates and is directed to the surface of the tank thereby decreasing turbulence and rise time. The baffles also minimize pool surface movement and tends to break floc formation. Coating the interior of the tank and the baffles with a coating that decrease the surface tension between the floatable material, clarified water and the interior surface further decreases surface turbulence and decrease rise time for the floatable waste material. The interior surface coating also reduces buildup of waste material on the interior walls and the baffle surfaces, which improves the efficiency of the rinse cycle. When draining the contents of a tank through a central port, as with the present invention, vortexing may occur if the flow rates are sufficiently high creating additional turbulence. One aspect of the present invention includes a deflector 15 positioned above an interior opening to the central port which reduces vortexing and turbulence. Non mechanical removal of the clarified water and floated waste material through the central port further reduces turbulence and increase the efficiency of the apparatus and methods.

A programable electronic controller 60 for controlling all aspects of operation for the apparatus and methods is provided and is electrically coupled to the rinse water valve actuators 53, waste water valve actuators 31, aerated water valve actuators 33, clarified water valve actuators 35, the waste material valve actuators 37, water pump 38, air pump 40, and aerator 41. The electronic controller receives signals from level sensors 61, a timers 62 and water clarity sensors 63 and actuates the valves for filling, retention and draining of the tanks as well as rinsing the tanks at or near the end of the draining period.

It is noted that the embodiment of the sequential air dissolved floatation apparatus and methods described herein in detail for exemplary purposes is of course subject to many different variations in structure, design, application and methodology. Because many varying and different embodiments may be made within the scope of the inventive concept(s) herein taught, and because many modifications may be made in the embodiment herein detailed in accordance with the descriptive requirements of the law, it is to be understood that the details herein are to be interpreted as illustrative and not in a limiting sense.

I claim:

1. A sequential air dissolved floatation apparatus, providing zero pool velocity and nonmechanical waste removal wherein a number of floatation tanks are filled with waste water charged with dissolved air, floatable waste material in the waste water being allowed to rise to the surface by floatation leaving clarified water as a bottom layer in the tank which is then drained from the bottom of the tank followed by draining the top layer of floated waste material, the apparatus comprising:

a) any number of floatation tanks each with a central port positioned at a lowest vertical position and a fill level sensor mounted near a top of each tank, b) a tank filling valve fitted with an operation actuator and inlet pipes connected to the central port of each tank which control inlet flow of waste water charged with dissolved air through the central port of each tank, c) a clarified water valve fitted with an operation actuator and outlet pipes connected to the central port of each tank which control outlet flow of clarified water through the central port of each tank, d) a waste material valve fitted with an operation actuator and outlet pipes connected to the central port of each tank which control outlet flow of floated waste material through the central port of each tank, e) a water clarity sensor mounted in an interior of each tank near the central port which detects the presence of clarified water, and f) a control system including a controller operable for receiving electrical signals from the fill level sensors and the water clarity sensors, such that the controller sends electrical signals to the valve actuators controlling a sequential tank filling flow rate with dissolved air charged waste water through the central port of each tank and controlling a retention period whereby waste material is allowed to float to the surface of the waste water in each tank, controlling outlet flow rate of the clarified water from the central port of each tank, and controlling outlet flow rate of the floated waste material from the central port of each tank allowing the tanks to be filled and drained sequentially to achieve a net flow of waste water to the apparatus.

2. The sequential air dissolved floatation apparatus as set forth in claim 1 wherein each tank includes a conical shaped bottom with a centrally located port located at a lowest vertical position on each tank.

3. The sequential air dissolved floatation apparatus as set forth in claim 1 wherein each tank further comprises an interior with baffles and deflectors positioned to increase the surface contact of floating waste material and clarified water thereby decreasing back mixing, minimizing pool surface movement, reducing floc formation, and reducing any waste material float period.

4. The sequential air dissolved floatation apparatus as set forth in claim 1 wherein each tank further comprises, an interior surface coated with a surface tension reducing coating which decreases back mixing, turbulence, and interior surface waste material buildup, increases rinse efficiency, and reduces any waste material float period.

5. The sequential air dissolved floatation apparatus as set forth in claim 1 wherein each tank further comprises a number of rinsing water nozzles positioned over a top of each tank and directed to rinse an interior surface of each tank, and wherein for each tank a flow of rinse water is controlled by a number of rinse water valves each fitted with an actuator which receives an electrical signal from the controller to open any number of the valves and rinse the interior surfaces of the tank at a conclusion of draining the floated waste material and before filling the tank with waste water charged with dissolved air.

6. The sequential air dissolved floatation apparatus as set forth in claim 1 wherein each tank further comprises a number of rinsing water nozzles positioned over a top of each tank and directed to rinse an interior surface of each tank, and wherein for each tank a flow of rinse water is controlled by a number of rinse water valves each fitted with an actuator which receives an electrical signal from the controller to open any number of the valves sequentially to maintain an optimum rinse water flow rate and thereby rinse the interior surfaces of the tank at a conclusion of draining the floated waste material and before filling the tank with waste water charged with dissolved air.

7. The sequential air dissolved floatation apparatus as set forth in claim 1 wherein the apparatus comprises at least three tanks and wherein, for each tank, an interior volume, a waste water inlet flow period, a retention period, and an outlet flow period are dimensioned and adjusted so that the time required to fill the tank about equals the retention period and further about equals the combined outlet flow period of both the clarified water and waste material.

8. The sequential air dissolved floatation apparatus as set forth in claim 1 wherein the apparatus comprises at least two tanks and wherein, for each tank, an interior volume, a waste water inlet flow period, a retention period, and an outlet flow period are dimensioned and adjusted so that the time required to fill the tank about equals the retention period and further about equals the combined outlet flow times for both the clarified water and waste material.

9. The sequential air dissolved floatation apparatus as set forth in claim 1 wherein, for each tank, the dissolved air in the charged waste water is provided by an aerator which dissolves air under pressure in a clarified water stream and through which dissolved air and clarified water is added to the inlet flow of waste water to the tank.

10. The sequential air dissolved floatation as set forth in claim 1 wherein any number of the tanks are stacked vertically thereby minimizing space needed for containing the system.

11. A sequential air dissolved floatation apparatus, providing zero pool velocity and nonmechanical waste material removal wherein each of three floatation tanks are sequentially filled with waste water charged with dissolved air, floatable waste material in the waste water being allowed to rise to the surface by floatation leaving clarified water as a bottom layer in each tank which is then drained from the bottom of each tank followed by draining the top layer of floated waste material, the apparatus comprising:

a) a central port positioned at a lowest vertical position and a fill level sensor mounted near a top of each tank, b) a tank filling valve fitted with an operation actuator and inlet pipes connected to the central port of each tank which control inlet flow of waste water charged with dissolved air through the central port of each tank, c) a clarified water valve fitted with an operation actuator and outlet pipes connected to the central port of each tank which control outlet flow of clarified water through the central port of each tank, d) a waste material valve fitted with an operation actuator and outlet pipes connected to the central port of each tank which control outlet flow of floated waste material through the central port of each tank, e) a water clarity sensor mounted in an interior of each tank near the central port which detects the presence of clarified water, and f) a control system including a controller configured to operate by steps comprising:

(i) electrically operating a tank filling valve of a first tank filling the first tank with dissolved air charged waste water to a level of a fill level sensor in the first tank, (ii) repeating step (i) for a second tank after the first tank is filled, and simultaneously allowing the floating waste material to rise to a surface of the waste water in the first tank, (iii) repeating step (i) for a third tank after the second tank is filled, and simultaneously electrically operating a clarified water outlet valve on the first tank allowing the clarified water to be drained from the first tank and then electrically closing the clarified water outlet valve when clarified water is not detected by the water clarity sensor in the first tank and simultaneously opening a waste material outlet valve allowing the waste material to be drained from the first tank and simultaneously opening any number of rinse water valves thereby rinsing the interior of the tank, simultaneously allowing the floating waste material to rise to a surface of the waste water in the second tank, (iv) repeating step (i) for the first tank after the third tank is filled and simultaneously electrically operating a clarified water outlet valve on the second tank allowing the clarified water to be drained from the second tank and then electrically closing the clarified water outlet valve when clarified water is not detected by the water clarity sensor in the second tank and simultaneously opening a waste material outlet valve allowing the waste material to be drained from the second tank while also simultaneously opening any number of rinse water valves to rinse the interior surfaces of the tank, simultaneously allowing the floating waste material to rise to a surface of the waste water in the third tank, (v) repeating step (i) for the second tank after the first tank is filled and simultaneously electrically operating a clarified water outlet valve on the third tank allowing the clarified water to be drained from the third tank and then electrically closing the clarified water outlet valve when clarified water is not detected by the water clarity sensor in the third tank and simultaneously opening a waste material outlet valve allowing the waste material to be drained from the third tank while also simultaneously opening any number of rinse water valves to rinse the interior surfaces of the tank, simultaneously allowing the floating waste material to rise to a surface of the waste water in the first tank, and (vi) repeating steps iii–v.

12. The sequential air dissolved apparatus as set forth in claim 11 wherein for each of the three tanks the apparatus further comprise; an interior volume of each tank, a waste water inlet flow period, a waste material float period, and an outlet flow period which are dimensioned and adjusted so that the time required to fill a tank about equals the waste material float period and further about equals a combined outlet flow period of both the clarified water and waste material.

13. The sequential air dissolved apparatus as set forth in claim 11 wherein the apparatus further comprises a number of tank interior rinse nozzles mounted and directed to rinse an interior surface of each tank and which include any number of rinse water valves each fitted with an actuator which is actuated by the controller to sequentially rinse the interior of the tank after the waste material drain period but before the waste material outlet valve has been closed to assure that all waste material has been drained from the interior of each tank.

14. The sequential air dissolved apparatus as set forth in claim 11 wherein each tank includes a conical shaped bottom with a centrally located port located at a lowest vertical position on each tank.

15. The sequential air dissolved apparatus as set forth in claim 11 wherein each tank further comprises an interior with baffles and deflectors positioned to increase the surface contact of floating waste material and clarified water thereby reducing back mixing, floc formation, pool velocity and vortexing, and reducing any waste material float period.

16. The sequential air dissolved floatation apparatus as set forth in claim 11 wherein each tank further comprises an interior surface coated with a surface tension reducing coating which decreases back mixing, turbulence, and interior surface waste material buildup, increases rinse efficiency, and reduces any waste material float period.

17. The sequential air dissolved floatation apparatus as set forth in claim 11 wherein, for each tank, the dissolved air in the charged waste water is provided by an aerator which dissolves air under pressure in a clarified water stream and through which dissolved air clarified water is added to the inlet flow of waste water to the tank.

18. The sequential air dissolved floatation as set forth in claim 11 wherein any number of the tanks are stacked vertically thereby minimizing space needed for containing the system.

19. A sequential air dissolved floatation apparatus, providing zero pool velocity and nonmechanical waste material removal wherein each of two floatation tanks are sequentially filled with waste water charged with dissolved air, floatable waste material in the waste water being allowed to rise to the surface by floatation leaving clarified water as a bottom layer in each tank which is then drained from the bottom of each tank followed by draining the top layer of floated waste material, the apparatus comprising:

a) a central port positioned at a lowest vertical position and a fill level sensor mounted near a top of each tank, b) a tank filling valve fitted with an operation actuator and inlet pipes connected to the central port of each tank which control inlet flow of waste water charged with dissolved air through the central port of each tank, c) a clarified water valve fitted with an operation actuator and outlet pipes connected to the central port of each tank which control outlet flow of clarified water through the central port of each tank, d) a waste material valve fitted with an operation actuator and outlet pipes connected to the central port of each tank which control outlet flow of floated waste material through the central port of each tank, e) a water clarity sensor mounted in an interior of each tank near the central port which detects the presence of clarified water, and f) a control system indicating a controller configured to operate by the steps comprising:

(i) electrically operating a tank filling valve of a first tank filling the first tank with dissolved air charged waste water to a level of a fill level sensor in the first tank, (ii) repeating step (i) for a second tank after the first tank is filled, and simultaneously allowing the floating waste material to rise to a surface of the waste water in the first tank while the clarity sensor of the first tank signals the controller to open the clarified water valve to drain clarified water from the first tank which clarified water outlet flow rate about equals a floatable waste material rise rate so that after about all the clarified water has been drained from the first tank about all the floatable waste material has risen to the top surface of the waste water, the controller then closing the clarified water outlet valve and simultaneously opening a waste material outlet valve and simultaneously any number of rinse water valves on the first tank draining and rinsing about all the waste material from the first tank, (iii) repeating step (ii) for the first tank after the second tank is filled, and simultaneously allowing the floating waste material to rise to a surface of the waste water in the second tank while the clarity sensor of the second tank signals the controller to open the clarified water valve to drain clarified water from the second tank which clarified water outlet flow rate about equals a floatable waste material rise rate so that after about all the clarified water has been drained from the second tank about all the floatable waste material has risen to the top surface of the waste water, the controller then closing the clarified water outlet valve and simultaneously opens a waste material outlet valve and simultaneously any number of rinse water valves on the second tank draining and rinsing about all the waste material from the second tank, and (iv) repeating steps ii–iii.

20. The sequential air dissolved floatation apparatus as set forth in claim 19 wherein the two tanks further comprise; an interior volume of each tank, a waste water inlet flow period, a waste material float period, and an outlet flow period which are dimensioned and adjusted so that the time required to fill a tank about equals the waste material float period which about equals a combined outlet flow period of both the clarified water and waste material.

21. The sequential air dissolved floatation apparatus as set forth in claim 19 wherein the apparatus further comprises a number of tank interior rinse nozzles mounted and directed to rinse an interior surface of each tank and which include any number of rinse water valves each fitted with an actuator which is actuated by the controller to sequentially rinse the interior of the tank after the waste material drain period but before the waste material outlet valve has been closed to assure that all waste material has been drained from the interior of each tank.

22. The sequential air dissolved floatation apparatus as set forth in claim 19 wherein each tank includes a conical shaped bottom with a centrally located port located at a lowest vertical position on each tank.

23. The sequential air dissolved floatation apparatus as set forth in claim 19 wherein each tank further comprises an interior with baffles and deflectors positioned to increase the surface contact of floating waste material and clarified water thereby decreasing back mixing and reducing any waste material float period.

24. The sequential air dissolved floatation apparatus as set forth in claim 19 wherein each tank further comprise an interior surface coated with a surface tension reducing coating which decreases back mixing, turbulence, and any waste material float period.

25. The sequential air dissolved floatation apparatus as set forth in claim 19 wherein, for each tank, the dissolved air in the charged waste water is provided by an aerator which dissolves air in a clarified water stream and through which dissolved air clarified water is added to the inlet flow of waste water to the tank.

26. The sequential air dissolved floatation as set forth in claim 19 wherein any number of the tanks are stacked vertically thereby minimizing space needed for containing the system.

* * * * *